United States Patent [19]

Jans et al.

[11] Patent Number: 4,860,344

[45] Date of Patent: Aug. 22, 1989

[54] CIRCUIT ARRANGEMENT FOR TELECOMMUNICATIONS SWITCHING SYSTEMS, PARTICULARLY TELEPHONE SWITCHING SYSTEMS, ETC.

[75] Inventors: Herbert Jans, Neuried; Klaus Brandmaier, Taufkirchen; Siegfried Pohl, Oberschleissheim, all of Fed. Rep. of Germany

[73] Assignee: Siemens Aktiengesellschaft, Berlin and Munich, Fed. Rep. of Germany

[21] Appl. No.: 195,412

[22] Filed: May 16, 1988

Related U.S. Application Data

[63] Continuation of Ser. No. 894,763, Aug. 8, 1986, abandoned.

[30] Foreign Application Priority Data

Aug. 14, 1985 [DE] Fed. Rep. of Germany ....... 3529171

[51] Int. Cl.$^4$ .............................................. H04M 3/36
[52] U.S. Cl. ..................................... 379/113; 379/137
[58] Field of Search ............... 379/111, 112, 113, 133, 379/134, 135, 136, 137, 138, 208, 243, 244

[56] References Cited

U.S. PATENT DOCUMENTS

| | | | |
|---|---|---|---|
| 3,413,420 | 11/1968 | Radius et al. | 379/134 |
| 3,517,123 | 6/1970 | Harr et al. | 379/113 |
| 4,497,979 | 2/1985 | Phelan | 379/244 |
| 4,564,725 | 1/1986 | Daisenberger | 379/138 |
| 4,613,729 | 9/1986 | Daisenberger | 379/137 |
| 4,626,624 | 12/1986 | Daisenberger | 379/137 |
| 4,626,625 | 12/1986 | Daisenberger | 379/137 |
| 4,629,830 | 12/1986 | Daisenberger | 379/138 |

FOREIGN PATENT DOCUMENTS

| | | |
|---|---|---|
| 0104637 | 4/1984 | European Pat. Off. . |
| 163103 | 5/1984 | European Pat. Off. . |
| 166101 | 6/1984 | European Pat. Off. ............ 379/134 |
| 0121239 | 10/1984 | European Pat. Off. . |
| 56-90692 | 7/1981 | Japan . |

OTHER PUBLICATIONS

"Performance of a Monitor For a Real-Time Control System" Erna S. Hoover and Barry J. Eckhart, AFIPS Conference Proceedings, vol. 29, 1966, pp. 23-35.
IBM Technical Disclosure Bulletin, vol. 25, No. 1 Jun., 1982, pp. 431-432.
Telcom Report, vol. 4 (1981), Special Issue "EWSD'-'Digital Switching System.

*Primary Examiner*—Stewart J. Levy
*Assistant Examiner*—Lawrence G. Fess

[57] ABSTRACT

Seizable, connection-associated switching devices of various types emit processing requests with different urgency degrees to a central sequential logic system for information which are to be processed with different urgency dependent on type. A limit value which may be set in an occupation rejection device based on the measure of a continuously-measured, momentary sequential logic system load serves as a comparison normal and effects that processing requests are rejected (accepted) when the urgency value is lower than (greater than) the limit value. In accordance with the constant, type-associated residual acceptance value stored in the request rejection device for each of the various types of processing requests, a respective rejection character is assigned in cyclical succession to a plurality of processing requests corresponding in number to a respective cycle via the urgency value of the respective processing requests of the appertaining type when the critical limit value is exceeded, being respectively assigned to all but one of these processing requests, whereby this one processing request has an acceptance character assigned thereto.

3 Claims, 1 Drawing Sheet

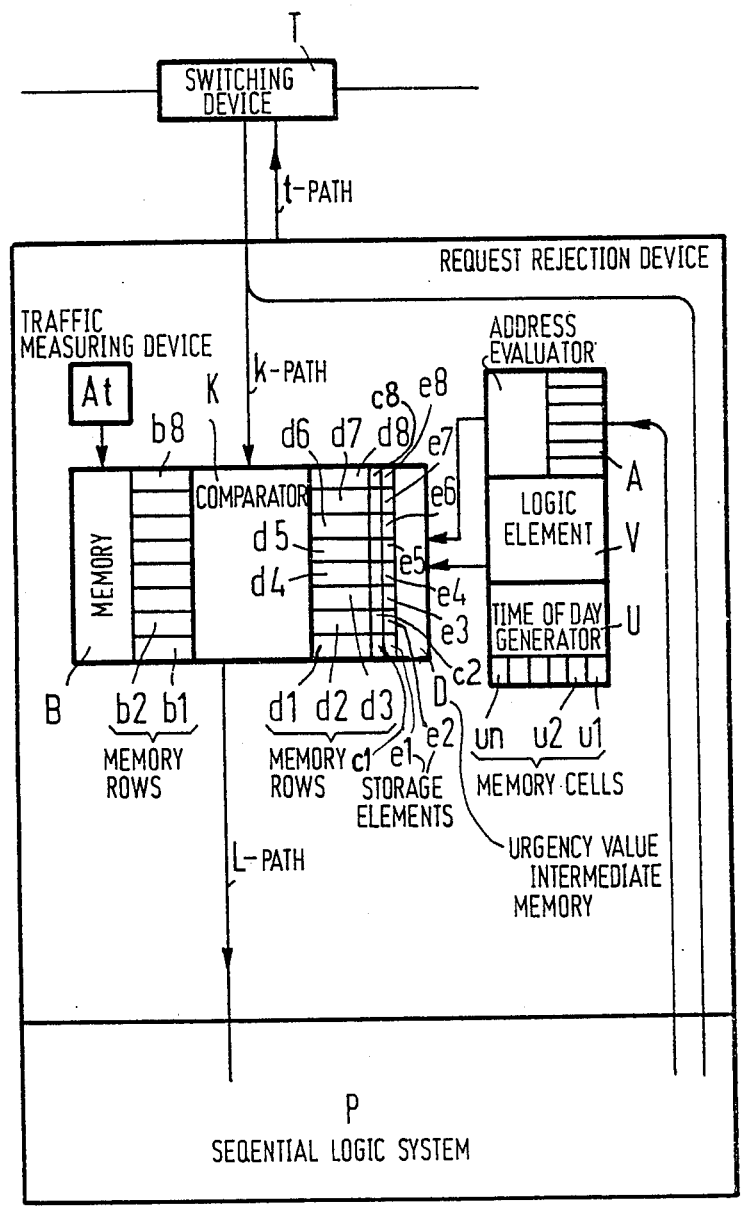

CIRCUIT ARRANGEMENT FOR TELECOMMUNICATIONS SWITCHING SYSTEMS, PARTICULARLY TELEPHONE SWITCHING SYSTEMS, ETC.

This is a continuation of application Ser. No. 894,763, filed Aug. 8, 1986, now abandoned.

BACKGROUND OF THE INVENTION

The German published application DE 3416592 and European Patent Application EP 0134010 A1, fully incorporated herein by this reference, disclose a counting device which serves for the acquisition of processing requests directed to a sequential logic processing system and which effects a rejection of an appropriate portion of these processing requests based on the measure of a percentage transmitted thereto by a traffic measuring device. In an arrangement of this known type, therefore, a rejection percentage which can be set in the counting device provides that all processing requests are identically treated. Some of the incoming processing requests are accepted based on the measures of the rejection percentage, but others are rejected. Processing requests are caused by arrival of information in connection-associated switching devices which is to be processed. This information can be selection information as well as other switch identifiers serving for establishing connections and for maintaining connections. Processing requests are also caused by new seizures of subscriber lines and trunks. Such requests are output to information-processing, central or subcentral, sequential logic systems by connection-associated switching devices.

In comparison thereto, the German published application DE 3416074, fully incorporated herein by this reference, discloses discrimination of processing requests into a plurality of urgency categories. The disclosed arrangement includes a seizure rejection device which qualitatively marks seizures (new occupations) as to be accepted in part and as to be rejected in part based on values (percentages) prescribed therefore. In addition, an urgency evaluating auxiliary unit is provided which re-marks higher urgency occupations already marked to be rejected, as being still acceptable, and likewise re-marking occupations of lower urgency already marked as acceptable as to be rejected, carrying this marking out on the basis of urgency data which are associated with each occupation, whereby the sums of the occupations (occupations to be accepted or, respectively, rejected) remain unaltered.

While in the arrangement disclosed in DE 3416592 and EP 0134010 A1, processing requests are acquired in toto and some of them are marked as acceptable and some are marked as rejectable simply on a quantitative basis, in the arrangement disclosed in DE 3416074, a discrimination of the occupations and of the processing requests lying therein is provided based on the measure of urgency values so that the occupations or processing requests are rejected or accepted based on their respective degree of urgency. In practical terms, this means that the occupations or processing requests having a lower degree of urgency, i.e. having the lowest urgency values, are affected first by the rejection measures such that, given a correspondingly higher rejection percentage, the seizures or processing requests of a second degree of urgency, i.e. having a second lowest urgency value, are also subject to the rejection measures. Given a further rejection, the seizures or processing requests having an even higher urgency value are affected by the rejection measures, etc, until, finally, the rejection measures also affect the seizures for processing requests of a highest degree of urgency which, therefore, are respectively marked with a highest urgency value. When the various urgency values of processing requests therefore first relate to new seizures of subscribers, secondly relate to seizures incoming via trunk lines and, third, relate to occupations outgoing via trunk lines, then it is advantageous to prioritize the processing requests for occupations outgoing via trunks over those for occupations incoming via trunk lines and to, in turn, prioritize all these processing requests over those which result from new seizures of subscribers. These relationships and principles are treated in the German published application 33 11 900, (U.S. 4,564,725, issued Jan. 14, 1986). also fully incorporated herein by this reference.

The present invention relates to a circuit arrangement for telecommunications switching systems, particularly telephone switching systems, comprising: central and/or sub-central information-processing sequential logic systems having a limited call-handling capability with respect to the information processing capacity; traffic measuring devices for identifying the information-processing traffic load of a respective sequential logic system and for the recognition of information-processing traffic overloads caused by processing requests; and comprising request rejection devices, serving as a defense against such overloads, in which a critical limit value can be set based on the measure of the respectively identified information-processing traffic load. It is also provided that different types of processing requests have different urgency values individually assigned thereto, and which, on the basis of a respective comparison of the urgency value of each processing request to a critical limit value respectively, the arrangement assigns these an acceptance character or a rejection character when the urgency value is greater than or, respectively, lower than the critical limit value, and by way of which each of the processing requests for incoming information are supplied or not supplied to the sequential logic system for processing in accordance with the appertaining character which has been assigned, whereby processing requests having above-average urgency are taken into consideration with a certain priority over processing requests having below-average urgency with respect to their processing in the sequential logic system.

The critical limit value is therefore a controllable comparison basis. Upon arrival of each processing request, it serves as a measure for deciding the acceptance or rejection thereof in the specified manner. The urgency value associated with each processing request is compared to this limit value.

The urgency value is formed from the results of continuously-executed measurements relating to this sequential logic system which measure its information-processing traffic load. The magnitude of the urgency value corresponds to a percentage of processing requests to be rejected due to the respective momentary operating situation. This percentage is therefore all the higher the higher the traffic load.

In a known manner, the processing requests are not uniformly accepted or rejected. They are accepted or rejected based on the respective magnitude of each of the individual urgency values which, therefore, are respectively compared to the momentary limit value.

A circuit arrangement of this type may be derived from the German published application DE 34160374, referenced above. Given a heavier traffic load of the central sequential logic system due to processing requests, therefore, this circuit arrangement enables the same to be treated based on their respective urgency degree, i.e. to still accept some of them, but to reject the rest. The urgency degrees of the connection-associated switching devices have urgency values assigned thereto, the connection-associated switching devices, given a seizure of a connection-associated switching device, respectively associating these urgency values to the processing requests emitted to the appertaining information-processing sequential logic system. Depending on the critical limit value which is set in the request rejection device, the appertaining processing request is still accepted or is still rejected based on a comparison of the appertaining urgency value to the limit value and based on whether this appertaining processing request is of the one type or the other type, as set forth above.

The connection-associated switching devices can be subscriber line circuits and connector sets. The latter can be prioritized over the subscriber line circuits. Given a certain degree of traffic load, this would mean that processing requests which come from connector sets would still be accepted, but no processing requests coming from subscriber line circuits would, by contrast, be accepted. In addition, the connection-associated switching devices can also be discriminated based on more than two types and the urgency degrees assigned thereto can be correspondingly multiply graduated in the described manner.

SUMMARY OF THE INVENTION

Given elevated traffic load and more intense rejection measures correspondingly required for the processing requests of the various types thereby affected, the object of the present invention is to guarantee a certain possibility for establishment of connections. Such a possibility should be uniformly present for all subscribers affected by the rejection measures. The restrictions undertaken should have such an influence that, given a particularly high degree of restriction, balanced conditions are established for the processing requests of the various types caused by an emergency operation mode which still remains. Having the load behavior leading to oscillatory events due to unsuitable rejection measures should also be avoided.

According to the present invention, the above object is achieved in that, based on the measure of a constant, type-associated residual acceptance value stored in a request rejection device for each of the various types of processing requests, a respective rejection character is assigned in a cyclical succession to a plurality of processing requests of the same type corresponding in number to a respective cycle via the urgency value of the respective processing requests and of the appertaining type when the critical limit value is exceeded, the rejection character being assigned to all but one of these processing requests, this processing requests having an acceptance character assigned thereto.

The application of a residual acceptance value to processing requests of all types prevents new seizures from being initially entirely rejected, and prevents the load from sinking so greatly as a result thereof that all rejection measure are then canceled, that an overload then again occurs, etc, i.e. prevents an oscillatory event which relates to the load. Furthermore, the measures of the present invention guarantee a certain emergency call connection possibility for the subscribers.

BRIEF DESCRIPTION OF THE DRAWING

Other objects, features and advantages of the invention, its organization, construction and operation will be best understood from the following detailed description, taken in conjunction with the accompanying drawing, or which there is a single FIGURE showing, in schematic form, an exemplary embodiment of the invention.

The exemplary emodiment of the invention is shown only in terms of its component parts which contribute significantly to an understanding thereof.

DESCRIPTION OF THE PREFERRED EMBODIMENTS

The exemplary embodiment shown on the drawing shows portions of the circuit arrangement for telephone switching technology which is presumed to be known in terms of its many possibilities of realization. In the present case, it is assumed to be a matter of a telephone switching system wherein the overall control events, for example establishing connections, are centrally or subcentrally controlled. It is therefore assumed that a central or subcentral information-processing sequential logic system P serves for the execution of the control. Naturally, it has limited call-handling capability with respect to the information-processing capacity.

The upper portion of the drawing shows a connection-associated switching device T. In fact, connection-associated switching devices are prsent in great numbers. These connection-associated switching devices can be a matter of subscriber line circuits, selection receiver sets, connector sets, line terminator sets of local and long-distance trunk lines, and the like. In case the telephone switching system is constructed in pulse code modulation (PCM) technology, the connection-associated switching devices T may be ports in the connecting groups. More detailed relationships regarding this are set forth in the description of the digital switching system EWSD in the supplement to the periodical "telcom report", 1981, and are also set forth in U.S. 4,564,725, fully incorporated herein by this reference.

Information which is to be processed arrives in the connection-associated switching devices T. This is thereby a matter of all switch identifiers which are output by subscriber stations from which subscribers intend to establish connections. The analogous case is true of connection-associated switching devices which are not subscriber-associated devices, for example connector sets, line terminator circuits, and the like. In addition, detailed particulars concerning the task of processing of incoming information are fully set forth in the aforementioned German published application DE 3416074.

All information arriving in the connection-associated switching devices T is processed by the sequential logic system P which, as already indicated, can also be provided in multiple numbers. The information is continuously interrogated in a known manner with the assistance of scan events and the sequential logic system P calls the information in from the connection-associated switching devices T.

Due to the limited nature of the call-handling capability of the sequential logic system P, known traffic measuring devices At continuously measure the information-processing traffic load of the sequential logic system P. This is thereby a matter of the load of the sequential logic system P with requests for processing information incoming into the connection-associated switching devices T. A central sequential logic system P can also be loaded with information-processing requests which have a different origin, for example for routine checks within the sequential logic system itself, and the like.

The traffic measuring devices which are presumed here to be known therefore serve for the identification of the information-processing traffic load of the sequential logic system P. This serves for the recognition of information-processing traffic overloads caused by processing requests. Each information to be processed which has arrived into a connection-associated switching device T results in a processing request which is directed to the sequential logic system P. When the quantity of information to be processed which is incoming overall causes an information-processing traffic overload at the sequential logic system P, then measures for defense against such overloads are initiated. For this purpose, request rejection devices are provided, these seeing to it that an excess of incoming information to be processed is rejected. Corresponding connections in the processing of being set up are, accordingly, not completed; the appertaining, dialing subscriber receives a busy signal in a known manner. Advantageously, it is principally new seizures which are affected by the rejection measures, namely with priority over processing requests for information which arrives for the completion of connections already in the process of being established.

Of course, the request rejection devices only have to develop their effect when the information-processing traffic load of the sequential logic system P becomes too heavy. Depending on the information-processing traffic load of the sequential logic system P which has been reached, a request rejection device must reject more or less of the information-processing requests which arrive overall. The degree of the load or, respectively, overload of the sequential logic system P is momentary and determines a respective proportion of the totality of the processing requests for rejection. For this purpose, a critical limit value can be set in a request rejection device based on the measure of the respectively-identified information-processing traffic load (At). This is the determining factor for the proportion of processing requests directed overall to the sequential logic system P which are to be rejected.

As already set forth in the aforementioned German published application, the urgencies of the various processing requests are taken into consideration in the rejection of processing requests. It is advantageous, for example, in the establishment of connections to prefer information-processing requests for connection establishment operations based on the measure of the progress of the respective connection establishment which has already been achieved. Accordingly, to preferably undertake rejections, insofar as those for incoming connections for all of the information processing, i.e. all of the sequential logic system work which has already been performed up to then for the appertaining connection set up is lost given a rejection of a processing request. Accordingly, processing requests of the various types can be equipped with correspondingly different urgency degrees. In accordance therewith, different urgency values are individually assigned to these differently-urgent processing requests.

The various urgency degrees of different types of processing requests, however, can also be originally conditioned by different subscriber connection privileges. As an exception, subscriber locations can also have special connection privileges in comparison to a normal traffic privilege which lends them priority over subscriber stations having normal connection privilege in a connection establishment. In comparison thereto, there can also be catastrophe-privileged subscriber stations which are, in turn, serviced with priority over all other subscriber stations in establishing connections. In this context, therefore, different urgency degrees of different types of processing requests derive from the various subscriber connection privileges which are stored for the appertaining subscribers.

A request rejection device then functions such that it undertakes a comparison of the urgency value of each processing request to the critical limit value. The drawing indicates a request rejection device K including a comparator. It is supplied with processing requests via a path k. For each processing request, a request rejection device K emits an acceptance character or a rejection character to the sequential logic system P via a path L, whereby the latter is respectively initiated to accept the appertaining processing requests or reject the same, i.e. to accept the appertaining information to be processed and to process the same in a known manner or to transmit an appropriate, contradictory signal via a path t to the appertaining, connection-associated switching device T, whereby it is signaled that the appertaining connection establishment cannot be continued. A corresponding busy signal is emitted to the calling subscriber in a known manner.

The drawing also illustrates a traffic measuring device At with the assistance of which a critical limit value, which has already been set forth above, is continuously identified, and then accepted into a memory B of the request rejection device having eight memory rows b1–b8 associated therewith. It is assumed that this storage is comprised therein so that one of the memory rows b1–b8 receives a corresponding marking. Accordingly, it is assumed that one of the different, possible critical limit values is stored.

As shall be set forth in greater detail below, the respective urgency value coresponding to a processing request is supplied to an urgency value intermediate memory D which likewise contains eight memory rows d1–d8. Here it is assumed that the respective urgency value is likewise storable and that one of the memory rows of the urgency value intermediate memory D is correspondingly marked.

The request rejection device further comprises a comparator K which, after the arrival of each processing request, compares the urgency value assigned thereto, and intermediately stored in the intermediate urgency value memory D, to the critical limit value stored in the memory B. When the urgency value is greater than the critical limit value, the comparator K emits an acceptance character to the sequential logic system P. When the urgency value is lower than the critical limit value, then the comparator K forms a counting character.

As has been set forth above, an urgency value belongs to every processing request. Each urgency value is marked or signaled in that one of the memory rows d1–d8 is marked. Thus, whenever a processing request arrives, the respective urgency value is stored in the intermediate urgency value memory D, one of the memory rows d1-d8 of which is marked. Therefore, there are eight different possible urgency values, each urgency value having one of the eight memory rows d1-d8 allocated to it.

As further shown on the drawing, the memory rows d1-d8 have storage elements e1-e8 assigned thereto which are provided for storing constant residual acceptance values fixed for each of the various types of processing requests. These residual acceptance values, fixed per type of processing request, determine an upper limit of processing requests to be rejected per type. The type of a processing request is, of course, dependent upon the type of call associated equipment generating the processing request. Per type of incoming processing request, therefore, the residual acceptance value specifies that portion of those processing requests of this type which are to be rejected when and as long as the critical limit value exceeds the respective type-associated urgency value. This occurs when the urgency of an incoming processing request c1-c8 is not high enough as compared to the critical limit value, in order to be able to accept all processing requests of the appertaining type.

When, for example, the processing request having the urgency value 3 becomes subject to rejection measures given a critical limit value of four or higher and when a remainder of 10% of the processing requests having the urgency value 3 are still accepted in this operating situation, i.e. are still to be accepted, then a residual acceptance value of 90 is stored for this type of processing request in the storage element e3 assigned to this type of processing request. The analogous case applies to the processing requests of other types and the storage elements e1-e8 assigned thereto.

In addition, each of the storage elements e1-e8 also contains further storage elements for counting residual c1-c8 acceptance values per type of processing requests. Each time, upon arrival of a processing request, if the urgency value thereof lies below the critical limit value, the comparator forms a counting character. This causes the residual acceptance value stored in a storage element e1-e8 for the appertaining processing request to be supplied to the aforementioned storage cells of the storage element which serve for counting the residual acceptance values. In conjunction with the percentage of 10% and the residual acceptance value of 90 provided above as an example, it is assumed that the counting volume of the memory cells in each of the storage elements c1-c8 amounts to 100. When the residual acceptance values of respectively 90 are then successively supplied to the storage cells of a storage element (for example the element c3), then a respective counter overflow occurs successively given nine counting characters arriving in this manner.

Respectively proceeding beyond a highest count value, the counting therefore again occurs at the value zero; i.e. the counting occurs cyclically. Given the numerical example begun above, therefore, an overflow no longer occurs at the tenth counting character which arrives after nine overflows. A rejection character is formed each time an overflow occurs and is attached to the appertaining processing request; when, as in the tenth case set forth above, no overflow occurs, then a rejection character is not formed. In contrast to the 9 processing requests which arrived previously, the tenth processing request is accepted.

It is here additionally mentioned regarding the above-specfied numerical example that the storage cells c1-c8 of the storage elements e1-e8 serving for the purpose of counting can also be constructed such that a different highest count value occurs, for example a highest count value of 8. When the minimum proportion of processing requests to be accepted amounts to 12.5% (i.e. ⅛ of 100%), then a residual acceptance value of 7 would be stored. Given these numerical conditions, it would then follow that, when the processing request of a specific type have become subject to the rejection measures, only 7 of 8 processing requests must be affected and that, respectively, one processing request is to be subsequently accepted.

In this manner, a counting of the rejections is executed for each of the various types of processing requests on the basis of a type-associated, stored residual acceptance value, being executed insofar as and as long as the critical limit value is higher than the respective, type-associated urgency value. The minimum proportion of processing requests to be accepted is thereby guaranteed for each type of processing request, this being the minimum number of processing requests still to be accepted for the appertaining type of processing request given occurrence of the rejection measures.

It is also possible to provide and store of a uniform residual acceptance value common to all types of processing requests. Given this condition, the counting of the count characters can also occur in common for the various types of processing requests.

The present invention is of a principle significance for accepting and rejecting processing requests which are directly caused by new seizures via subscriber lines and trunks.

Each processing request, therefore, has an acceptance character or a rejection character assigned thereto so that processing requests having a low urgency degree, for example requests that arrive with the lowest urgency degree, nonetheless have a chance of producing a connection. The requirement is caused by the emergency call possibilities set forth in detail above, which must be established at any time. On the one hand, therefore, the described priority should be guaranteed in phases of rejections of processing requests. On the other hand, however, processing requests to which a low, for example the lowest, urgency value is assigned, cannot be entirely rejected. It is thereby advantageous to make the chances of success for subscribers without special connection privileges independent from the subscriber behavior insofar as possible. This is achieved with the assistance of the circuit arrangement set forth herein.

In order to realize the exchange-oriented operations set forth above, it is provided in the manner set forth that the connection-associated switching devices provided in greater plurality, which output the processing requests with the same urgency degree and to which identical urgency values are assigned by way of their addresses, are additionally marked by an ordering value likewise derived from the address upon emission of a respective processing request. Each of the connection-associated switching devices is selectable with the assistance of an address. Upon output of a processing request, the appertaining address is present in the sequential logic system P. Among other things, this address is supplied to an address evaluator A. This circuit derives the respective urgency value from the respective address. In addition to being defined by the address itself, the urgency value can also be additionally defined by the respective type of information to be processed.

It can then also be presumed that a great plurality of processing requests can have the same urgency value. Upon emission of a respective processing request, the address evaluator A additionally derives an ordering value from the respective address of the connection-associated switching device. Let it here be assumed that this is composed of the two last bits of a significantly more extensive address information.

The processing requests having the same urgency value are therefore additionally marked by this ordering value which is acquired with the assistance of the address evaluator A. These ordering values partially differ from one another. They are uniformly distributed to the various processing requests, whereby respectively one and the same ordering value continuously reoccurs, this applying to each of the various ordering values. The urgency values assigned to the processing requests are therefore varied by the ordering values which augment the same. Connection requests originally having the same urgency are thereby divided into urgency groups having urgency classifications of different values differing per urgency value.

As already set forth, each incoming processing request temporarily has the urgency value assigned thereto stored in the urgency value intermediate memory D. Insofar as the urgency values of the processing requests are varied by the ordering values which augment the same, the urgency classification derived by the addition of the ordering value is stored in the urgency value intermediate memory D instead of the respective urgency value.

It still remains to be set forth how the various urgency classifications per urgency value are acquired. As already indicated, an ordering value augmenting the respective urgency value is identified for specific processing request with the assistance of the address evaluator A. This ordering value is supplied to a logic element V. A time-of-day (TOD) generator U is also provided, the momentary time of day being stored therein in binarily-encoded form. It is assumed that the memory cells un–u1 serve this purpose. Let each of these memory cells serve for the storage of a respective bit of the time-of-day information. Let it also be assumed that the memory cells u1 and u2 are provided for the last two place values of the respective time-of-day information. Accordingly, the information in the memory cell u1 changes most frequently and that in the memory cell u2 changes with the second greatest frequency.

The logic circuit V then combines the ordering value of a processing request with those portions of the time-of-day information stored in the two memory cells u1 and u2. For example, this combination can occur in the form of a simple ANDing operation. The combination with the time-of-day information achieves an allocation of the plurality of urgency classifications per urgency value to the ordering value which changes cyclically in a time-dependent fashion. The assignment of the plurality of urgency classifications per urgency value to the ordering values is therefore cyclically interchanged in uniform time intervals. The various subscribers from whom the processing requests initially arrive with the same urgency value thereby have urgency classifications which change cyclically in uniform time intervals. It is thereby achieved that the prospects of success are more uniformly distributed for subscribers not having special connection privileges. In sequence, these subscribers have a prospect of success at certain times and do not have this prospect at other times; viewed on a chronological average, however, these subscribers all have the same prospect of success. Given a fundamentally identical connection privilege, some of these subscribers are also briefly preferred over the others. This preference changes cyclically among these subscribers. In phases of heavier traffic load and more intensive rejection measures, these subscribers thereby always temporarily have a prospect of success for completing a connection, particularly for emergency calls.

During the comparison to the critical limit value, therefore, the rejection device employs the urgency classification insofar as such a classification is acquired in addition to the given urgency value. The urgency classification is additionally acquired in the manner set forth, being acquired for processing requests which have a relatively low urgency degree, in particular those to which the lowest urgecy value is assigned.

As has been set forth above, the comparator K compares the respective urgency value or, respectively, the respective urgency classification to the critical limit value. It can be provided that the various urgency values and the various urgency classifications are always unequal to the critical limit value which has been set. This can be accomplished in that the critical limit values can always only be uneven numbers, whereas urgency values and urgency classifications can always be only even values. In case the respective urgency classification can also be equal to the critical limit value which has been set. It is provided that an acceptance character is likewise assigned to the appertaining processing requests given equality. In contrast thereto, it can also be provided that a rejection character is assigned to the appertaining processing request in this case.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a circuit arrangement for causing acceptance or rejection of processing requests for an information-processing sequential logic system of a telecommunications switching system, which logic system has a limited call-handling capability with respect to its information-processing capacity, in which a traffic measuring device identifies the information-processing traffic load of the information-processing sequential logic system caused by processing requests, in which a rejection device serves for defense against such overloads is provided in which a critical limit value can be set based on the measuring of the identified information-processing traffic load, and in which different urgency degrees of different types of processing requests have different urgency values individually assigned thereto, the improvement comprising:

means for comparing the individual urgency values to the critical limit value and producing an acceptance character when the urgency value is greater than the critical limit value, or for producing a rejection character if the urgency value is less than the critical limit and if addition of a residual acceptance value in a type associated residual acceptance value storage means produces an overflow; and means for accepting or rejecting the processing requests in response to the acceptance and rejection characters for processing by the sequential logic system so that processing requests having above-average urgency are taken into consideration with a certain priority over processing requests having below-average urgency with respect to their processing in the sequential logic system, said type associated residual acceptance value storage means storing said residual values representing a percentage of each type of each request to be rejected, and accumulating said residual values for each type of request in respective counter storage areas to reject the request when the counter storage area overflows and accept the request when there is no overflow.

2. The circuit arrangement of claim 1, wherein:
said comparison means includes means for assigning an acceptance character when the urgency value is equal to or greater than the critical limit and assigning a rejection character when the urgency value is smaller than the critical limit value and said overflow results.

3. The circuit arrangement of claim 1, wherein:
said comparison means comprises means for assigning an acceptance character to a processing request when the urgency value is greater than the critical limit and assigning a rejection character to the processing requests when the urgency value is equal to or less than the critical limit value and said overflow results.

* * * * *